United States Patent [19]

Ferri

[11] 4,364,755
[45] Dec. 21, 1982

[54] FILTER ASSEMBLY

[76] Inventor: Hans Ferri, Müllerwis 27, 8606 Greifensee, Switzerland

[21] Appl. No.: 331,887

[22] Filed: Dec. 17, 1981

[51] Int. Cl.³ .............................................. B01D 46/38
[52] U.S. Cl. ......................................... 55/290; 55/294
[58] Field of Search .................. 55/290, 294, 351, 400

[56] References Cited

U.S. PATENT DOCUMENTS

| | | | |
|---|---|---|---|
| 3,345,805 | 10/1967 | Sherrill | 55/290 |
| 3,887,344 | 6/1975 | Smith | 55/294 |
| 4,154,588 | 5/1979 | Herndon | 55/294 |

Primary Examiner—Bernard Nozick
Attorney, Agent, or Firm—Werner W. Kleeman

[57] ABSTRACT

A filter assembly contains a filter drum provided with a stationary air pervious cylindrical filter jacket. The axis of the filter drum preferably extends approximately horizontally. A rotating hollow shaft extends through the filter drum and in radial direction is rigidly connected for rotation to at least one suction nozzle. This suction nozzle serves for sucking-off solid materials through the rotating hollow shaft, these solid materials being separated at the inside of the filter jacket. The hollow shaft carries at least one carriage or slide which is rigidly mounted for rotation in radial direction upon the hollow shaft. For performing oscillating movements in axial direction upon the hollow shaft, this carriage or slide is connected to a device for guiding the at least one suction nozzle along the undulated or wave-shaped path over the inside of the filter jacket. The filter assembly preferably comprises a circular, rotating sieve or filter disc, constituting a pre-separator, which covers a front end of the filter drum and is connected to the hollow shaft, and a stationary suction device which acts upon the flow-side front surface of the filter disc serves for removing pre-separated solids from the filter disc.

9 Claims, 4 Drawing Figures

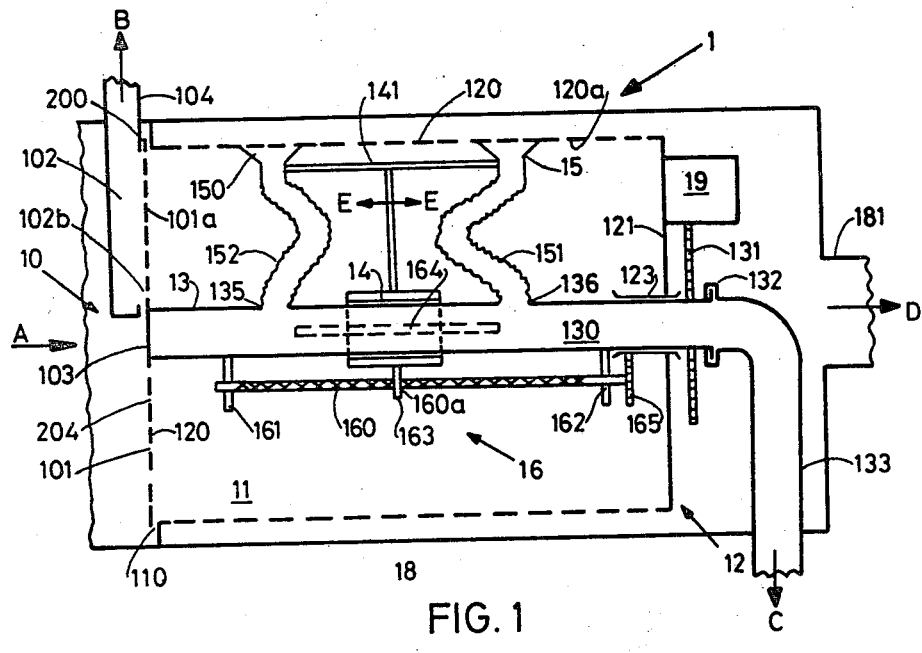

FILTER ASSEMBLY

BACKGROUND OF THE INVENTION

The present invention relates to a new and improved construction of filter assembly for removing or recovering respectively, fine or particulate, especially fibrous solid materials from a gas or air stream, respectively.

For cleaning large quantities of gas or air or for the return of waste therefrom, there are required filters, for instance in the textile technology, the asbestos or reinforced fibre art and for other processing methods where there occur health-hazardous suspendable solid particles which may cause, for instance, byssinosis.

Devices serving this purpose have been known to the art for a long time, for instance from British Pat. No. 16,392, U.S. Pat. No. 2,722,997 and German Pat. No. 2,751,789. Common to all these prior art devices is a separator provided with a filter drum which is open at one side and equipped with an approximately cylindrical stationary jacket or shell. This jacket or shell is formed of a material for instance a textile material or fibre fleece, which is gas-pervious but retains the fine or particulate solid particles entrained in the gas stream. The stationary filter drum is impinged through its free end by the gas stream which is to be filtered and this gas stream is conveyed by a forwardly arranged pressure blower or a subsequently arranged suction blower. The solid materials separated at the inner surface or side of the filter jacekt or shell have to be removed. From the initially mentioned British Pat. No. 16,362, filed in 1911, there has been known for quite some time the proposal of employing, for this purpose, suction nozzles which are intended to suck-off the solid materials separated at the inner surface of the filter jacket. Accordingly, the apparatus disclosed in this British Pat. No. 16,392 is provided with a coaxially arranged rotating hollow shaft. Connected to this hollow shaft in a manner so as to be non-movable in radial and axial direction are the suction nozzles. By means of a separate suction blower the solid matrials are sucked-off through the suction nozzles and the hollow shaft. In order to suck-off te entire inner surface of the filter jacket or shell there are employed a number of substantially slot-shaped, adjacently arranged suction nozzles, each of which extends in axial direction over a partial area of the inner surface, or there is employed a single suction nozzle whose suction slot extends axially over the entire axial length of the inner surface of the filter jacket. In both instances the suction nozzles pass through linear, substantially circular-shaped paths. However, a sufficient uniform suction effect upon the inner surface of the filter jacket heretofore has not been achievable with a practicable expenditure in equipment especially if the filter drum is stationary.

While there are known to the art, for instance from Swiss Pat. No. 591,054, oscillating suction nozzles which are displaceable in axial direction and arranged internally of the filter drum, such suction nozzles only can be used with rotating filter drums which are provided in axial direction with stationary suction nozzles, and this arrangement requires a separate drive for the oscillating motion in axial direction.

In order to avoid the disadvantages of internally sucking-off a stationary filter drum according to British Pat. No. 16,392, there has become known to the art from the aforementioned U.S. Pat. No. 2,722,997 and the German Pat. No. 2,751,789 the proposal of replacing the internally arranged suction nozzles by oscillating blast rings which are arranged externally of the filter drum. For this purpose, there is employed a substantially annular or ring-shaped tube which is provided with blast openings and which is displaced with an oscillating motion at the outside of the filter jacket in its axial direction by means of a motor. This annular or ring-shaped tube blows-off with pressurized air, against the main stream, the solid materials deposited at the inside of the filter jacket or shell. The thus blown-off solid materials are sucked-off through separate suction devices provided in the internal space of the filter drum, or they are sucked-off close to the floor of the drum, depending upon whether the axis of the filter drum is arranged vertically, according to the U.S. Pat. No. 2,722,997, or horizontally, according to the German Pat. No. 2,751,789.

However, as opposed to internally sucking-off the solid materials, blowing-off the same from the outside is associated with functional, especially aerodynamic and energy-related as well as constructional disadvantages.

SUMMARY OF THE INVENTION

Hence, it is a primary object of the present invention to provide a new and improved construction of filter assembly which is not afflicted with the aforementioned drawbacks and limtations of the prior art constructions.

Another important object of the present invention is to provide a new and improved construction of filter assembly which although simple in construction and design enables internally sucking-off a stationary filter drum, while avoiding the therewith associated state-of-the-art disadvantages of an irregular suction effect.

A further important object of the present invention aims at providing a new and improved construction of filter assembly which is simple in construction and operationally reliable, while fulfilling the intended purpose of reliably and positively cleaning a filter drum or the like from undesirable particles or materials deposited thereat.

Now in order to implement these and still other objects, which will become more readily apparent as the description proceeds, the filter assembly according to the present invention comprises a separator, which by means of a pressure or suction device is impinged from the inside with a gas stream containing the solid materials. The separator is provided with a filter drum containing a stationary, cylindrical and gas-pervious filter jacket, as well as an approximately axially arranged rotating hollow shaft which is connected to a drive. The shaft is rigidly connected in radial direction for rotation to at least one suction nozzle for sucking-off the solid materials which have been deposited at the inner surface of the filter jacket, by means of a suction device, through the suction nozzle and the hollow space of the hollow shaft. According to the invention there is provided at least one carriage or slide, which in radial direction is rigidly connected for rotation to the hollow shaft but in axial direction is displaceable thereupon and carries the at least one suction nozzle. A device which is rigidly connected for rotation to the hollow shaft serves for converting the rotary movement of the hollow shaft generated by the drive into axial oscillating movements of the slide which revolves together with the hollow shaft, thus guiding the at least one suction nozzle, which by means of a flexible conduit is connected to the hollow space of the hollow shaft, along a wave-like or undulatory path over the inner surface of the filter jacket.

The device according to the invention for generating the oscillating movement of the suction nozzles or the slide or carriage carrying the same, respectively, does not require its own motor drive. This is so because the rotary movement of the driven hollow shaft can be converted into an axial oscillating movement of the slide in a constructionally surprisingly simple manner, preferably by means of a cross-spindle or the like which is coupled with its one end to a stationary roll-off surface.

A further advantage of the filter assembly according to the invention resides in the features that the separator can be constructed in a simple and effective manner as a two-stage separator, i.e. provided with an integrated pre-separator.

Integrated pre-separators for two-stage gas filters having a cylindrical filter surface are known to the art. Thus, the filter assembly disclosed in the aforementioned Swiss Pat. No. 591,054 is of two stages, in that the rotating filter jacket of the main separator comprises a coaxially and internally arranged cyclone which is provided with a cylindrical preliminary filter wall constituting a pre-separator. However, the construction and operation of this prior art filter assembly is complicated and expensive. This is because the filter jacket of the main separator has to be constructed and driven to be rotatable and, moreover, because the suction nozzles need to be arranged in a relatively small, substantially ring-shaped chamber located between the pre-separator and the main separator. Furthermore, there is here required a relatively complicated control for controlling the oscillating movement of the suction nozzles and the pre-separator is energy-intensive.

In contrast thereto, the invention according to a preferred embodiment, wherein there is employed a substantially circular filter or sieve disc consituting a pre-separator and a stationary suction device essentially covering the work radius of the flow-side front face of this filter disc, affords the advantage of a filter assembly which contains an integrated pre-seperator and main separator. With respect to filtering efficiency and exploitation of the entire available space, this filter assembly design according to the invention is at least equal to the filter assembly disclosed in Swiss Pat. No. 591,054, but is considerably simpler in construction and less expensive than the latter.

This preferred embodiment of the filter assembly according to the invention further has the sieve or filter disc covering the inflow cross-section of the main separator, i.e. the flow-side front circular area of the filter drum which serves as the main separator. By means of the rotating hollow shaft there is thus not only caused the axial oscillation of the suction nozzles by means of the movement converting device rigidly connected to the hollow shaft for rotation, but there is also caused thereby the drive of the filter disc of the pre-separator.

BRIEF DESCRIPTION OF THE DRAWINGS

The invention will be better understood and objects other than those set forth above will become apparent when consideration is given to the following detailed description thereof. Such description makes reference to the annexed drawings which illustrate preferred exemplary embodiments of the invention and wherein:

FIG. 1 is a semi-schematic sectional view of a filter assembly according to the invention provided with a pre-separator;

FIG. 2 is a top plan view of the pre-separator of the filter assembly according to FIG. 1;

FIG. 3 is a flow chart depicting the mode of operation of the filter assembly illustrated in FIG. 1.

DETAILED DESCRIPTION OF THE PREFERRED EMBODIMENTS

Figure 4:
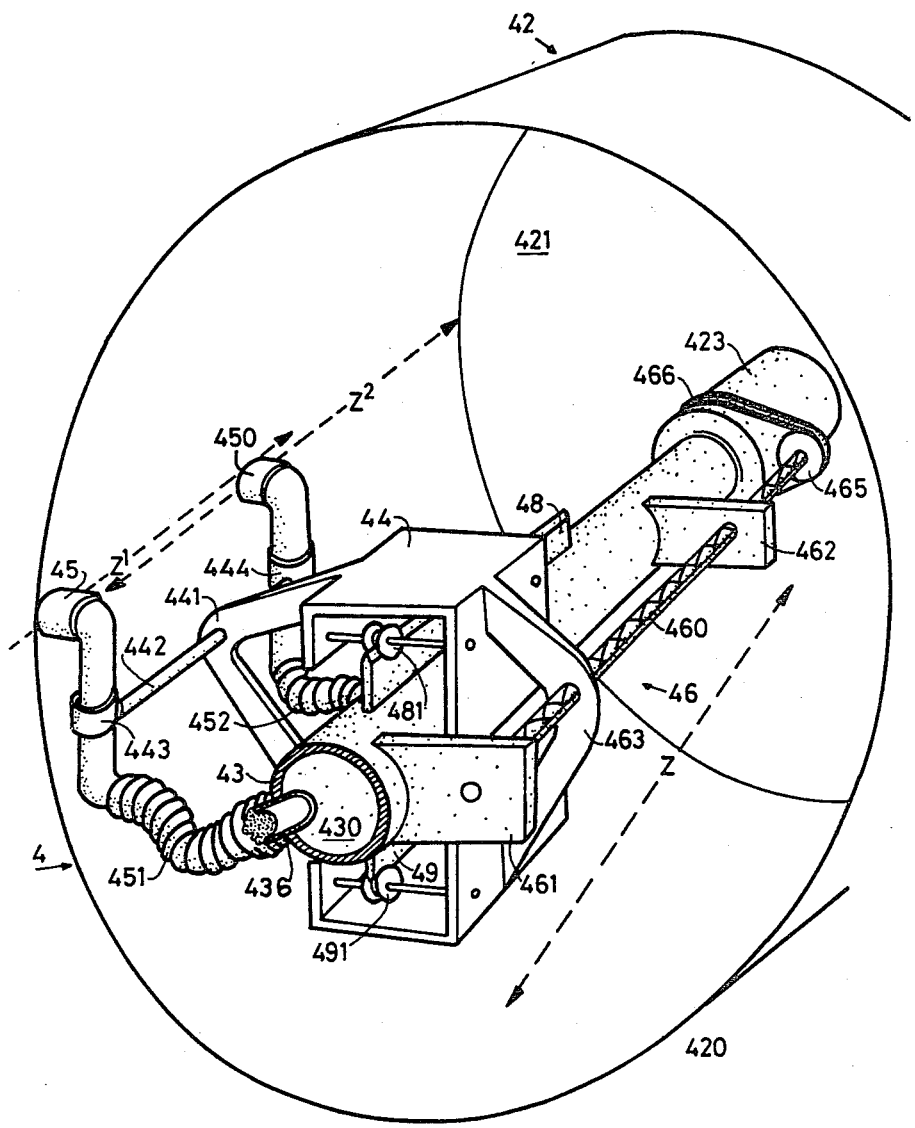
FIG. 4 is a slightly simplified perspective and partially sectional front view of a filter assembly according to the invention without a pre-separator.

Describing now the drawings, the filter assembly 1, which is illustrated by way of example in FIG. 1 in semi-schematic and sectional axial view, is installed within a chamber or compartment 18 which is illustrated in partially cut-away or fragmentary view and possesses a conventional design, such as constituted by a sheet metal housing or a housing formed of a different, practically impervious material.

An air stream A which is to be filtered initially arrives at a pre-separator 10. This pre-separator 10 possesses as its main components a rotating sieve or filter disc 101 which covers the practically open, flow-side front circular area or surface 120 of a separator 11 i.e. the inflow surface thereof. In order to avoid a partial by-passing of the pre-separator 10 at a slide location 110 located between the filter disc 101 and the separator 11, there can be used, for instance, a here not further illustrated but conventional slide or sliding seal in the form of a circular ring formed of a sliding material. This circular ring can be connected to the filter disc 101 and can slide at the front edge of the filter drum 12 or vice versa.

At least a part or preferably the predominant part of the circular surface or area of the filter disc 101 consists of a fine perforated material, for instance a narrow mesh sieve formed of organic-polymers or metallic monofilaments. This filter or sieve 101 is preferably relatively thin, for instance less than 3 mm and preferably less than 1 mm, and has an inner mesh width of, for instance, 100 to 250 $\mu$m. As a rule, the sieve or filter disc 101 is provided with a here merely generally indicated frame or holder 200 by means of which the filter disc or plate 101 is held under flat surface tension and can be maintained in a rotating motion. The frame 200 can be formed, for instance, by a not here further illustrated substantially circular outer ring, merely generally represented in FIG. 2 by reference character 202, a central guide disc 103 and a number of not particularly shown radial spokes for connecting the outer ring 202 of the frame 200 to the guide disc 103. Preferably, the filter or sieve disc 101 is practically flat. However, it also can be conical or curved in substantially circular manner, if the suction device 102 to be described hereinafter in greater detail can be appropriately adapted to this curved or domed shaped.

The fibres which are deposited by the air stream A at the front side or face of the sieve or filter disc 101 with respect to the direction of air flow and which filter disc rotates, for instance, at 3 to 4 revolutions per minute, are continually sucked-off by means of the stationary suction device 102 through a conduit or line 104 in the direction of the arrow B.

This suction device 102 essentially covers the entire work or effective radius of the filter disc 101, i.e. the radial portion of the rotating filter disc 101 which is provided with the sieve or filter openings generally indicated by reference character 204. The work radius of the filter disc 101 preferably is approximately equal to the radial width of the portion of the cross-sectional area of the main separator 11 which is subsequently arranged in the direction of the air flow.

The suction device 102 is constructed, for instance, as a linear slotted nozzle 102a, of which the nozzle slot or aperture 102b is located in close proximity to the filter surface 101a of the filter disc 101 at the gas flow infeed side thereof. The distance between the slot or slotted nozzle 102a and the filter disc 101 is preferably practically constant over the work radius of the filter disc 101 and amounts to, for instance, 5 to 30 mm. Of course, the suction action emanating from the suction device 102 and effective upon the filter disc 101 and the fibres separated-out thereupon, must be greater than the suction effect of the main separator 11. A continuous suction action of the suction device 102 is preferable, but there can be equally employed a pulsating suction action.

For instance, the gas or air stream B has at least approximately twice the velocity of the air stream D. There can be mentioned by way of example a flow velocity B of about 25 m/sec and a flow velocity D of about 8 m/sec.

The filter disc 101 is rigidly connected for rotation to the hollow shaft 13, e.g. by means of the guide disc 103, for instance by flanging or bolting the end face thereof to the shaft. The hollow shaft 13 extends axially within and preferably through the filter drum 12 of the main separator 11. In general the hollow shaft 13 not only is arranged axially to, but coaxially with respect to the filter drum 12.

The hollow shaft 13 is closed at its flow-side front end, for instance at location 103 defined by the guide or mounting disc, and fulfills a double function: it serves both for rotating the filter disc 101 and for guiding, moving and actuating suction nozzles 15 and 150 which remove the solid materials deposited at the inner surface 120a of the filter jacket or shell 120 of the main separator 11. For this purpose, the hollow shaft 13 is rotatably mounted in any suitable fashion, for instance as partially shown at location 123 in bearing means, and driven to rotate either in the same rotational sense or with an oscillatory movement by a suitable drive, such as for instance by the drive motor 19. This drive motor 19 is secured to a stationary end wall 121 of the filter drum 12 and acts, for instance, upon a drive element or wheel 131. This drive element or wheel 131 may be constructed as a gear, a friction wheel or a V-belt pulley and is drivingly connected to the here not particularly illustrated and usually appropriately stepped down drive wheel or gear of the drive motor 19.

At its rear end with respect to the flow direction the hollow shaft 13 is connected by means of a rotary flange 132 with a stationary suction line or conduit 133 which, in turn, is connected to a conventional suction unit 32 (FIG. 3) and leading to a conventional sack or bag filter 34 provided with a subsequently arranged dust bag 35 or the like.

Arranged upon the hollow shaft 13 is at least one carriage or slide 14 which guides over the inner surface 120a of the filter jacket or shell 120 at least one and preferably two or more of the suction nozzles 15 and 150 such that they radially revolve with the hollow shaft 13 and, moreover, are displaced in axial direction in an oscillating fashion according to the double-headed arrow E—E, i.e. such that these suction nozzles 15 and 150 perform a to-and-fro or reciprocatory motion.

The suction nozzles 15 and 150 are secured, for instance, to a rod 141 which, in turn, is connected to the slide or carriage 14. The suction nozzles 15 and 150 are connected by means of flexible hoses 151 and 152 and via appropriate opening studs or connections 136 and 135, respectively with the hollow space or interior 130 of the hollow shaft 13.

The slide or slide means 14 is rigidly connected for rotation to the hollow shaft 13, but is displaceable thereon in axial direction, for instance in that it bears in radially practically rigid but axially displaceable manner against a substantially sword-like or elongated guide or rail 164, which is indicated in FIG. 1 by broken lines. The guide or rail 164 or equivalent structure is rigidly connected to the hollow shaft 13, for instance welded or bolted thereto, and the carriage or slide 14 is connected to a here not illustrated guide groove or to guide rolls. For each slide or carriage 14 the hollow shaft 13 also can be provided with several, for instance pairs of rails 164 or else rails 164 which are peripherically distributed about the hollow shaft 13.

Rigidly connected to the slide 14 is a guide 163 which engages by means of a not particularly illustrated pin or groove into a guide channel or guide notch, generally indicated by reference character 160a, of a guide spindle 160 or equivalent structure, which preferably is a cross-spindle 160. The cross-spindle 160 is rotatably guided, for instance, in two bearing blocks 161 and 162 which are secured to the hollow shaft 13. The cross-spindle 160 can be placed into rotational movement by means of a wheel 165 or the like which is arranged at its one end and rolls upon a stationary surface provided for the end wall 121, for instance rolls upon, for instance, a flange, a bearing or a bearing collar 123. Consequently, the slide or carriage 14, and thus, at least one of the suction nozzles, such as the suction nozzle 15 are displaced in the axial direction E—E.

A cross-spindle 160 is preferable for controlling the axial displacement movements E—E, because then with a continuous movement of the hollow shaft 13 in the same rotational sense there can be generated an oscillating or reciprocating axial displacement of the slide or carriage 14. However, there are known to the art other different mechanical means, for instance reversing gearing, which are quite suitable for performing the axial to-and-fro displacement of the carriage or slide 14. Furthermore, with a periodically reversed rotational sense of the hollow shaft 13 there also can be employed a conventional spindle, i.e. a spindle which is not crossed, or the like.

The substantially cylindrical filter jacket or shell 120 can be formed in conventional manner of a filter mat material, needled felt or similar commercially available materials suitable for the separation of solid materials from a gas. In general, the filter jacket 120 should be capable of retaining solid particles, e.g. fibres or dust, which contain particles in a size range which is particularly harmful to the lungs, e.g. 7 to 15 $\mu$m, or below, e.g. down to 0.1 $\mu$m.

The dimensions of the pervious filter surface 120a of the filter jacket 120, the magnitude of the gas or air throughput quantity, the flow velocity and similar parameters for the main separator 11 and the filter jacket 120 are within the knowledge of those skilled in the art, and therefore, need not here be further discussed. For general orientation it might simply be remarked that a filter assembly constructed according to the invention can be designed without difficulty to handle throughput or through flow quantities in the technically important range of, for instance, 10,000 to 200,000 m³/h. Thus, there can be achieved with a priceworthy expenditure in equipment and systems operation, compliance for instance in the textile processing art, even with the very strict reference vlaues of ≧0.2 mg suspended material per m³ of air to be filtered, which are set for this industry by the more recent standard proposals (OSHA-regulations).

Also the mounting of the filter jacket 120 and the wall 121 at the inside of the chamber or compartment wall 18 equally is a measure which is known to those skilled in the art and can be realized in a relatively simple manner, for instance, by means of externally arranged peripheral rings and/or axial struts.

As previously mentioned in connection with the suction output and the suction effect of the suction device 102 of the pre-separator 10, the suction acting from the nozzles 15 and 150 upon the solid particles at the inner wall or surface 120a of the filter jacket 120 must be stronger than the adherence of the solid particles thereto. This adherence is not least of all dependent upon the suction capacity prevailing at the chamber outlet 181, i.e. the flow rate of the cleaned waste gas or outgoing air stream D.

For instance, the flow velocity at location C is at least twice the flow velocity at location D, and the aforementioned exemplary value of 25 m/sec for the flow velocity of the gas stream B in principle also is applicable to C.

However, the contaminated gas stream C, which is withdrawn through the conduit or line 133, does not necessarily have to act continually, but equally can be periodically present or appear in a pulsating mode, for instance as a function of the solids content or the degree of contamination of the gas or air stream which is conducted through the main separator 11.

The top plan view of the pre-separator 10 depicted in FIG. 2 shows the front cover wall 29 of the housing 18 and which is not illustrated in FIG. 1. The cover wall 29 can serve as a supporting surface for the filter jacket or shell 120 and is provided with a substantially circular opening which is covered by the sieve or filter disc 101. In the manner previously described the sieve or filter disc 101 slidingly and sealingly bears against this circular opening. In FIG. 2 there is illustrated only one suction arm 22 which is connected to the suction conduit or line 104 by means of a substantially chamber-like connection 23 for the purpose of removing the solids or fibres, accumulated in the pre-separator 10.

However, it is equally possible to employ two or more suction arms 22 and, if desired, to construct the same such that they comprise radially staggered suction nozzle regions or areas. The essentially radial or linear construction of the suction arm 22 illustrated in FIG. 2 equally is not critical, as long as the work radius of the sieve or filter disc 101 can be sucked-off. It is to be understood that even in the normally not preferred case of a periodic reversal of the rotational movement of the sieve or filter disc 101, i.e. in the instance of a partial rotation of the shaft 13 of less than 360°, there can be ensured for a complete sucking-off of the sieve or filter disc 101 in that the suction arm 22 extends over the entire diameter thereof and/or there is employed a plurality of radially distributed suction arms.

The flow circuit diagram illustrated in FIG. 3 demonstrates the entry of the contaminated gas or air stream at location A into the filter assembly 30 according to the invention. The fibre/air stream B generated in the pre-separator is sucked-off by means of the suction device 33 into a conventional fibre separator 36 which may be of any desired design. The fibre material separated therein may be, if desired, processed in a baling or packing press 37. The air which accumulates in the separator 36 and is only coarsely cleaned at that location is conducted back to the input or inbound stream A. Furthermore, the air stream C which contains solid materials, is sucked-off from the main separator, as described above by means of the suction device 32 and there then follows the conventional dedusting at locations 34 and 35. Finally, the gas or air stream D, as the case may be, which has been cleaned from its solid materials, is sucked-off by means of the suction device 31.

In FIG. 4 there is illustrated a filter assembly or unit 4 in a simplified perspective, partially sectional and cut-away view. The flow-side front end of the hollow shaft 43 and the filter drum 42 is cut-away, so that the internal space 430 of the hollow shaft 43 is visible. One of the incoming connections 436 for connection to the flexible conduit or line 451 of the related suction nozzle 45 equally is shown in cut-away view.

The cylindrical filter jacket or shell 420 of the drum 42 is closed at the rear end of the drum 42, for instance, by means of a sheet metal wall 421. Through this sheet metal wall 421 extends a bearing collar 423 in which there is mounted and guided the rotating hollow shaft 43.

Rigidly connected, for instance welded to the hollow shaft 43, are two guide rails 48 and 49, upon which the slide or carriage 44 can be displaced in both axial directions, according to the double-headed arrow Z, by means of pairs of rolls 481 and 491, of which only the front rolls can be recognized in the drawing of FIG. 4.

The suction nozzles 45 and 450 are connected to a holder bracket 441 of the carriage or slide 44 by means of a rod 442 which is provided at both its ends with two collars 443 and 444. Thus the suction nozzles 45 and 450 follow the axial to-and-fro displacement Z of the carriage or slide 44 according to the double-headed arrows $Z^1$ and $Z^2$ and during the rotation of the hollow shaft 43 are guided along wave-like or undulatory paths over the inner surface of the stationary filter jacket 420 by virtue of the connection of the carriage or slide 44 to the hollow shaft 43. This connection is movement-rigid or fixed in radial direction owing to the rails 48 and 49 and the pairs of coacting rolls 481 and 491 respectively. By means of the suction nozzles 45 and 450 the inner surface of the stationary filter jacket 420 is thus cleaned over its entire axial length from the solid materials which adhere thereto. In the instance of considerable axial length or extent of the filter jacket 420 there are beneficially provided a number of slides or carriages 44.

The to-and-fro motion of the slide 44 upon the hollow shaft 43, which is driven in any appropriate fashion, is generated by the device 46. For this purpose a cross-spindle 460 is rotatably mounted in two guides 461 and 462 which, in turn, are rigidly connected to the hollow shaft 43, for instance by welding or by a screw or bolt connection.

At its rear end the cross-spindle 460 carries a disc or wheel 465 which is in engagement with the stationary bearing collar 423 by means of an endless belt 466, for instance a rubber belt or a V-belt. During rotation of the driven hollow shaft 43 and the cross-spindle bearings or supports 461 and 462 connected thereto, the wheel 465 is rotated by the belt 466, and the transmission ratio essentially can be determined by means of the external diameter of the bearing collar 423 and the selectable diameter of the wheel 465 or equivalent structure. Of course, with a given rotational speed of the hollow shaft 43 there equally can be employed, apart from the transmission ratio, the thread pitch of the cross-spindle 460 for selecting the axial displacement speed or the oscillating frequency, respectively, of the carriage or slide 44 and thus that of the suction nozzles 45 and 450. The momentarily most suitable oscillating or reciprocating frequency of the carriage or slide 44 per revolution of the hollow shaft 43 can be influenced by a number of method parameters, but especially by the amount of solid materials deposited per unit of time at the inner surface of the filter jacket or shell 420. This amount of solid materials, in turn, is dependent upon the proportion of solid materials contained in the gas stream to be filtered and upon whether or not there is provided a preliminary filtering stage, for instance as described above. However, the selection of an optimum relationship between the oscillating frequency of the slide or carriage 44 and the rotational speed of the hollow shaft 43 clearly is within the ambits of the knowledge of those skilled in the art.

To a person skilled in this art it will easily be possible to recognize that there can be conceived numerous variations of the above-described embodiments of the new and improved filter assembly designed according to the teachings of the invention. Thus, the practically horizontal position of the filter drum and the correspondingly coaxial horizontal position of the hollow shaft, constitute a beneficial but in no way critical condition, i.e. the filter drum and hollow shaft can be positioned vertically or at an inclined position.

Furthermore, it may be beneficial to ensure for a periodic stripping or removal of the fibres accumulating at the outer region of the oscillating or to-and-fro moving suction nozzles. For this purpose, the filter drum may be provided with one or more concave or convex and generally axially extending grooves or channels, or else there can be effected in a different fashion a brief lifting-off of the oscillating suction nozzles from the inner surface of the filter drum, and which suction nozzles may, if desired, bear against the filter drum under the action of spring means or the like.

Furthermore, it is to be understood that each carriage or slide can carry a number of suction nozzles arranged at the inside and/or that there can be employed a number of carriages or slides, of which each one carries two or more such nozzles. If, in the instance where there is present a considerable axial length of the filter drum the hollow shaft carries two or more carriages or slides, then it is not necessary that each one of them is connected to its own device for generating the axial oscillating movement. It is possible that only a first slide or carriage is directly coupled to such device and the remaining slides or carriages are connected to this first carriage by means of a suitable connection rod or the like. However, in this case each slide or carriage preferably is guided at least at one rail or guided at a portion of an appropriately throughgoing rail. It equally is advantageous, especially when using a number of carriages or slides, to completely or partially compensate for any imbalance of the mass which rotates with the hollow shaft. This can be achieved, for instance, in that the nozzle supports, which protrude away from the related slides or carriages, are radially offset with respect to one another in an appropriate uniform manner.

While there are shown and described present preferred embodiments of the present invention, it is be be distictly understood that the invention is not limited thereto but may be embodied and practiced within the scope of the following claims.

What I claim is:

1. A filter assembly for the removal of solid materials from a gas stream, especially from an air stream during textile processing comprising:
   a separator means;
   means for delivering to the interior of said separator means a gas stream containing the solid materials;
   said separator means containing a filter drum provided with a stationary, substantially cylindrical and gas-pervious filter jacket;
   an approximately axially arranged rotating hollow shaft containing a hollow space and disposed within said filter drum;
   drive means operatively connected to said hollow shaft for driving said hollow shaft;
   at least one suction nozzle rigidly connected for rotation to said hollow shaft;
   a suction device for sucking-off through said suction nozzle and the hollow space of said hollow shaft the solid materials deposited at an inner surface of said filter jacket;
   at least one slide means rigidly connected for rotation in radial direction to said hollow shaft but displaceable in the axial direction of said hollow shaft;
   said at least one suction nozzle being operatively connected with said slide means;
   means rigidly connected for rotation to said hollow shaft for converting the driven movements of said hollow shaft generated by said drive means into axial oscillating movements of said slide means which revolves with said hollow shaft;
   said at least one suction nozzle being guided by said slide means along a substantially wave-like path over the inner surface of said filter jacket; and
   a flexible conduit connecting said at least one suction nozzle with said hollow space of said hollow shaft.

2. The filter assembly as defined in claim 1, further including:
   a rail for guiding said slide means;
   said rail being connected for movement to said hollow shaft; and
   said rail serving for coupling said slide means with said hollow shaft such that said slide means is displaceable in axial direction but connected for rotation practically rigidly to said hollow shaft.

3. The filter assembly as defined in claim 1, wherein:
   at least a portion of said hollow shaft which extends through said filter drum being arranged practically horizontally and coaxially with respect to said filter drum.

4. The filter assembly as defined in claim 1, wherein:
   said hollow shaft being guided through a stationary substantially circular end plate of said separator; and
   said hollow shaft being connected externally of said filter drum to said drive means which is secured to said end plate.

5. The filter assembly as defined in claim 1, further including:

a pre-separator cooperating with said separator means;

said pre-separator comprising a substantially circular filter disc and a stationary suction device essentially covering a work radius of said filter disc at a gas flow infeed side of a front face of said filter disc;

said filter disc covering a front circular area of the filter drum of said separator means; and said filter disc being connected for movement to said driven hollow shaft.

6. The filter assembly as defined in claim 1 or 5, wherein:

said means for converting the driven movements of said hollow shaft into axial oscillating movements of said slide means comprising cross-spindle means;

two holding elements for rotatably mounting said cross-spindle means;

said two holding elements being arranged in spaced relationship from one another and secured to said hollow shaft;

a guide with which said slide means is rigidly connected; and said guide being mounted to be axially movable upon said cross-spindle means.

7. The filter assembly as defined in claim 6, further including:

means defining a rolling stationary contact surface;

a coupling;

said cross-spindle means having one end region thereof in engagement with said stationary rolling contact surface by means of said coupling whereby the movement of said driven hollow shaft in relation to said stationary filter drum is converted into a rotary movement of said cross-spindle means.

8. The filter assembly as defined in claim 5, further including:

a suction blower to which there is connected said suction device of said pre-separator; and said gas stream delivering means including a suction blower; and said suction blower of the pre-separator being controllable independently of the suction blower for delivering the gas stream through said separator means.

9. The filter assembly as defined in claim 5, wherein:

said filter disc being constructed to possess a substantially flat configuration; and said suction device of said pre-separator possessing at least one slot nozzle means acting upon the gas flow infeed side of the front face of said filter disc.

* * * * *